Nov. 17, 1936.　　　　G. W. WALTON　　　　2,061,016

NATURAL COLOR PICTURE REPRODUCTION

Filed March 16, 1932　　2 Sheets-Sheet 1

Nov. 17, 1936.  G. W. WALTON  2,061,016

NATURAL COLOR PICTURE REPRODUCTION

Filed March 16, 1932  2 Sheets-Sheet 2

Patented Nov. 17, 1936

2,061,016

UNITED STATES PATENT OFFICE 2,061,016

NATURAL COLOR PICTURE REPRODUCTION

George William Walton, London, England

Application March 16, 1932, Serial No. 599,273
In Great Britain February 20, 1931

6 Claims. (Cl. 88—16.4)

The present invention relates to natural color picture reproduction. Throughout this specification the word "object" will be used to designate any type of moving or stationary picture, scene, view or the like.

The present invention is confined to methods and means involving the production of continuous images of moving objects as distinct from a series of images giving the impression of continuity because of persistence of vision, and is directed to giving to such images a natural colored appearance. The invention is concerned, more particularly, but not exclusively with methods and means involving the production of one-dimensional images, hereinafter referred to as stixographs, of the kind in which all elemental areas of an object are, in the stixograph thereof, deployed so that they do not overlap one another, regarded in at least one direction in the surface in which the image is formed. Usually, adjacent lines of the object are, in the stixograph, longitudinally displaced relative to one another.

The invention may be applied to all forms of picture reproduction in which continuous images of the object are produced.

Methods of and means for forming stixographs and for reforming two-dimensional images therefrom are described in the specifications of patent applications Serial Nos. 400,883, filed October 19, 1929, and 426,344, filed February 6, 1930.

It is an object of the present invention to provide, in such apparatus, means whereby two-dimensional images of an object may be converted into a colored stixograph thereof, the color of which continuously varies in time, and reproduced so as to give to the eye the impression of a two-dimensional naturally colored image of the object.

The present invention is not concerned with ordinary two-dimensional cinematography where normal two-dimensional representations of scenes and the like are recorded and reproduced. In such systems, as is well known, a series of separate photographs are made of the scene at the rate of say 20 per second and it has been proposed to utilize with such systems a rotating disc-shaped color filter having a plurality of transparent colored sectors separated by opaque sectors, the color transmission of each transparent sector varying gradually throughout a part of the visible spectrum. The effect of this is that the color of the light forming each image in turn is changed continuously during the time the image is active upon the sensitive surface. Thus the effect upon the emulsion is an aggregation of the effects of each of the colors and could equally well be produced apparently by a filter of a single appropriate color.

The present invention also involves producing continuous changes in color of the image but does not make the effect aggregative. For example in its application to cinematography the image produced upon the sensitive surface is of the stixograph type above referred to and the sensitive surface is moved continually so that as the color of the light forming the stixograph is changed so the position on the sensitive surface at which the stixograph is operative also changes.

The continuous changes of color can be produced either by arranging a filter having discontinuous changes of color transmission at a point removed from a focal point or else a filter having continuous changes of color transmission can be used.

The invention will be described, by way of example, with reference to the accompanying drawings, in which Figs. 1 and 2 illustrate, diagrammatically and in plan and elevation respectively, an optical arrangement in accordance with the present invention for producing a color cinematographic record of an object.

Figure 1:
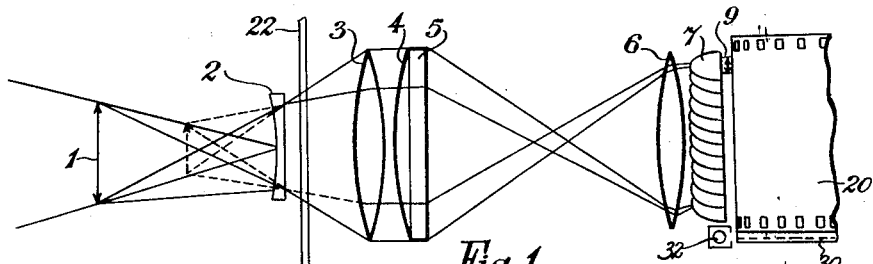
Figure 2:
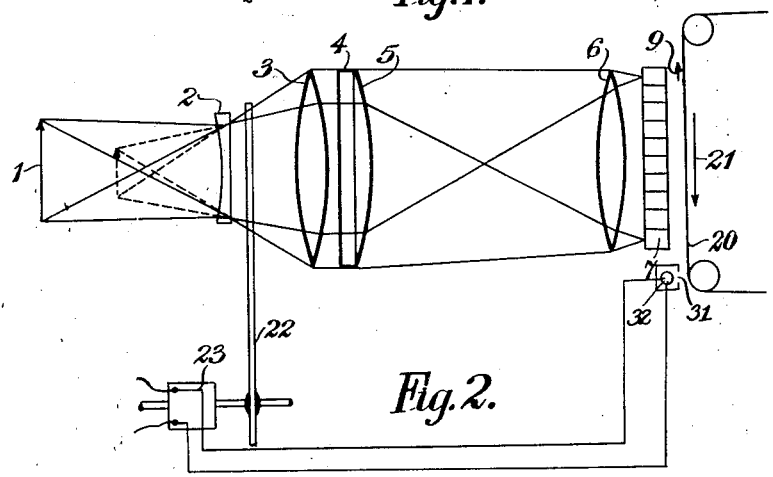

Referring now to Figs. 1 and 2, 1 is a colored object of which a motion picture record is to be made; the object will therefore be considered to be moving. 2, 3, 4, 5, 6, and 7 are the parts of an optical system such as that described in the specifications of patent applications Serial Nos. 400,883 and 426,344, which forms a record of the stixograph type on a photographic surface 20 at 9.

A brief description indicating the way in which a stixograph is formed will be given and fuller information as to this can be obtained from the prior applications above mentioned.

The device 7 is known as an echelon device and comprises, in the example shown in Figs. 1 and 2, a pile of cylindrical lenses arranged in staggered formation. The number of these lenses is made equal to the number of horizontal strips into which the object is to be sub-divided and the greater this number the greater the detail in the final picture. Each lens is in the form of a thin lamina and the axes of these lenses are arranged to lie parallel to one another in a vertical plane perpendicular to the optical axis of the system. Lenses 2, 3, and 6 are spherical lenses while lenses 4 and 5 are cylindrical lenses, the axis of lens 4 being vertical and that of lens 5 horizontal. Lens 5 has power only in a vertical plane and is so arranged that with lenses 2, 3, and 6, it focusses an image of object 1 in the entrant surface (that is the left hand surface) of the echelon device 7. Lens 4 and the lenses of the echelon device, on the other hand, have power only in horizontal planes and are so arranged that, with lenses 2, 3 and 6, they focus an image of the object 1 near the emergent surface of the echelon device, for example at 9. It will be seen from Fig. 2 that the uppermost lamina only receives light from the lowermost horizontal strip of the object 1 and the lowermost lamina only receives light from the uppermost horizontal strip of the object. Similarly, the intermediate laminae each receive light from a different intermediate horizontal strip of the object. We may therefore consider only one strip, say the lowermost strip of the object, and consider the way in which an image of this strip is formed. A similar argument will then clearly be applicable to all the other strips. This lowest strip will be viewed only by the uppermost lamina and an image thereof will be formed at 9. This image is focussed (and therefore has definition) only in a horizontal direction. In a vertical direction an image is formed at the entrant surface of the lamina and suffers repeated reflections between the upper and lower surfaces of the lamina in passing through the lamina to the emergent surface. The result of this is that, in a vertical direction, any small elemental zone transverse of the length of the strip of object 1 is in the image at 9 represented by a small vertical zone of uniform density representative of the average density of the corresponding zone of the object.

The stagger between the laminae is such that the images of the various strips produced at 9 do not overlap one another when viewed in a vertical direction. Because of this each of the small elemental image zones can be extended indefinitely in a vertical direction and will not interfere with any other zone.

In Figs. 1 and 2 the stixograph 9 is formed on a photo-sensitive film 20 which is moved at a uniform speed in the direction of the arrow 21. Each elemental zone then traces upon the film a narrow strip or line parallel to the direction of motion of the film. If the elemental zone of the object remains of constant density, the line image representing this zone will remain of constant density. If, for example due to motion of the object, the density or brightness of the elemental zone changes, then the density of the line image will change correspondingly.

It will be clear that if a film bearing an image of the kind described be moved between a light source (serving to illuminate at any one time only a narrow transverse strip of the film) and the echelon device 7, there will be produced on a screen placed at 1 a two dimensional image.

Figure 3:
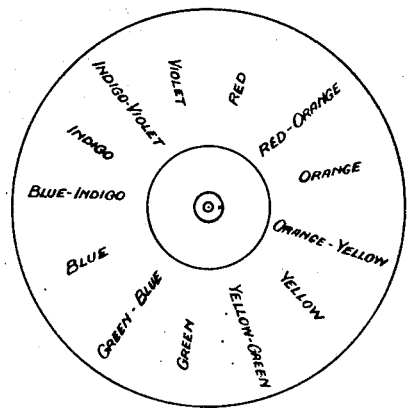
Fig. 3 is a side view of a color disc which is also illustrated in Figs. 1 and 2.
Figure 4:
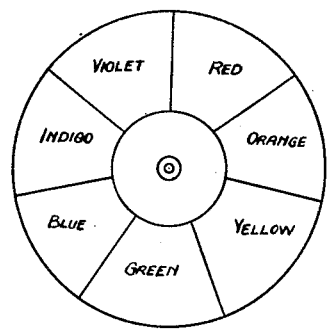
Fig. 4 illustrates a color disc which may be used in place of the one illustrated in Fig. 3, and Figs. 5 and 6 illustrate diagrammatically alternative optical arrangements in accordance with the present invention.

Referring to the particular arrangement according to this invention shown in Figs. 1 and 2, means are provided for producing a continuous variation of the color of the light forming the stixograph image 9. In this example a rotatable disc 22 (Figs. 1 and 2) is inserted in the optical system of Figs. 1 and 2 at a point which is not a focal plane. In Figs. 1 and 2 it is shown between the lenses 2 and 3. The color of the light transmitted by the disc 22 varies with its angular position in the beam, and preferably its color transmissivity, in an angular direction, varies continuously throughout the visible spectrum. Two forms of such discs are shown in Figs. 3 and 4. In Fig. 3 the color transmission of the disc varies, in an angular direction, gradually and continuously throughout the visible spectrum whilst, in the disc of Fig. 4, selected sectoral portions of the disc transmit selected colors. Even in the case of Fig. 4, however, there will be no discontinuity in the change of color since in changing from one color to another the beam of light forming the image will assume a color which is a mixture of the two colors mentioned.

When the disc of Fig. 3 is inserted in the path of the light in the optical arrangement of Figs. 1 and 2, the light which forms the stixograph at 9 is varied gradually and continuously. But whichever type of disc is used, the same color of light forming the stixograph will recur at a frequency depending upon the speed of rotation of the disc. The disc is therefore rotated at a speed sufficiently high, say 15 revolutions per second, to ensure that the eye cannot perceive the changes of color.

The stixograph recorded upon the film thus changes not only in accordance with the movements of the object but also in accordance with color of the light with which they are formed, i. e. with the angular position of the disc 22.

In order to reproduce ordinary two-dimensional images of the object in their natural colors from a stixographic record made in the manner described in connection with Figs. 1 and 2, an optical system similar to that used for the recording is used, in an inverse manner, for reproducing. A film bearing a stixographic record is moved at constant speed past a slit in a plane corresponding to the plane 9 of Figs. 1 and 2 and is illuminated by a beam of white light which passes from the film through the slit. Light which is transmitted by the slit passes through an optical system similar to that of Figs. 1 and 2, but in the reverse direction, and thus two-dimensional images of the object are reformed in a position corresponding to 1. In order, however, that these two-dimensional images shall be formed in their natural colors a color disc, similar to 22 of Figs. 1 and 2, is inserted in the reproducing optical system and is rotated at such a speed relative to the speed of the film, that a stixograph on the film which was formed at an instant by, say, red light, is reformed into a two-dimensional image also by red light. To ensure that such is the case there is made upon the edge of the film 20 (Figs. 1 and 2), simultaneously with the recording of the one-dimensional images, a periodically varying record 30 of the speed of the motor 23 (Fig. 2) which serves to drive the color disc 22. This may be done by illuminating the edge of the film 20 periodically through the aperture 31 by means of a light-source 32 energized by the voltage driving the motor 23. Such a record is equivalent to a record of the rate of change of color of the light forming the stixograph, and may conveniently be in a form similar to that of the known varying width type sound record.

Figure 5:
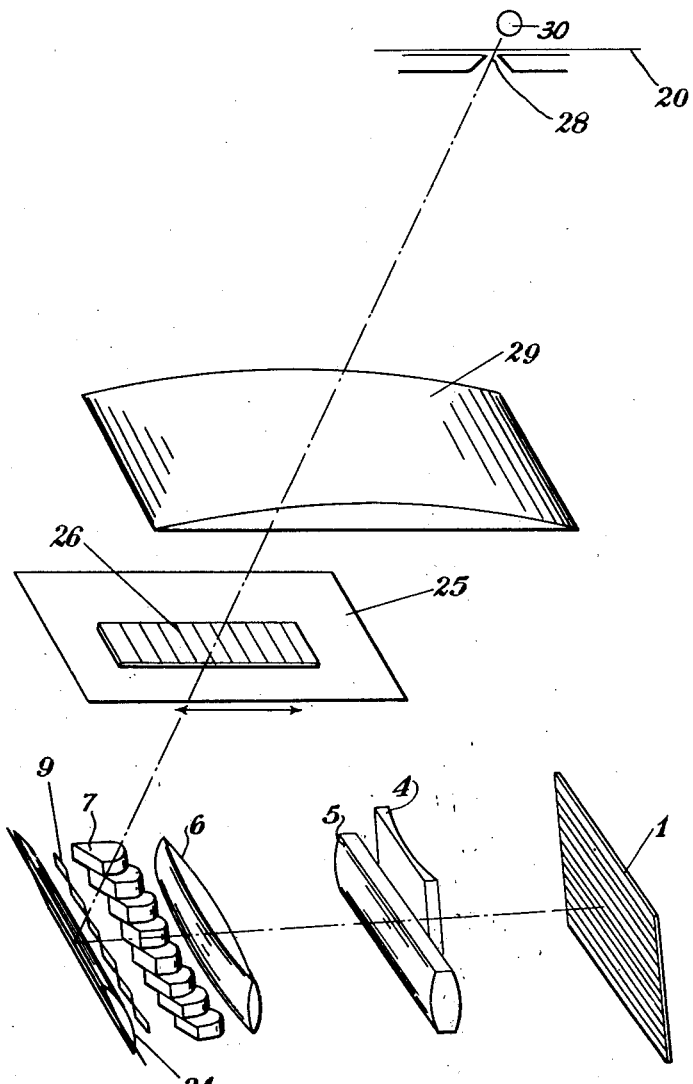

In Fig. 5 there is illustrated another optical arrangement in accordance with the present invention. A stixograph image of a moving or stationary colored object 1 is formed, by means of a lens system which may be similar to that of Figs. 1 and 2, in a plane 9. The lens system shown comprises an echelon device 7, a spherical lens 6 and cylindrical lenses 4 and 5 arranged with their axes perpendicular to one another. The lenses of the echelon device 7 together with lenses 4 and 6 are arranged to focus images of horizontal strips of the object 1 at 9 while lenses 5 and 6 cooperate in focussing an image of the object 1 in the entrant or right-hand surface of the echelon device 7. No color disc corresponding to 22 of Figs. 1 and 2 is however, inserted in the light path between the object and the image at 9, and in order to produce the desired color effects an image of the stixograph image at 9 is formed in a plane 25 by a curved oscillatory mirror 24. The mirror 24 is oscillated so that the one-dimensional images formed in the plane 25 move to and fro in a direction at right angles to the definition dimension of the stixograph in the plane 25, that is, in the direction of the arrows. Just below the plane 25 there is placed a stationary color filter 26 the color transmissivity of which varies throughout the visible spectrum in any order of colors in the direction of vibratory motion of the one-dimensional images formed in the plane 25. A lens 29 serves to concentrate the light from all parts of the filter 26 on to a slit 28 behind which is moved a sensitive film 20. The color of the stixograph image formed on the film 20 will therefore change continuously as the mirror 24 vibrates.

In reproducing pictures from stixograph records the optical arrangement of Fig. 5 may be used inversely, a light source 30 being disposed upon the side of the film 20 remote from the mirror 24 and the mirror 24 being controlled by an electric oscillation produced from the record as previously described, so that colored two-dimensional images of the object are reproduced.

Figure 6:
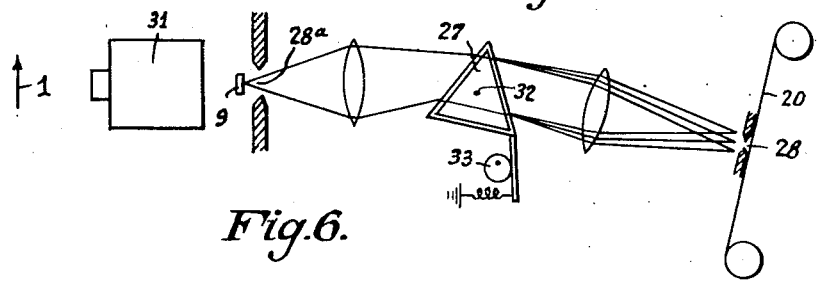

A further method of obtaining color effects is illustrated in Fig. 6. A stixograph image 9 of the object 1 is formed in its natural colors by means of a suitable optical arrangement, indicated by the numeral 31 in Fig. 6, on a slit 28a. The dimension in which the stixograph has no definition is parallel to the plane of the paper. The color of the light forming the image 9 is then analyzed by the prism 27 and falls on the slit 28. The prism 27 is oscillated at a suitable frequency, such as 10 per second about an axis 32 with the aid of suitable means represented schematically by cam 33, and the light passing through the slit 28 therefore changes in color throughout the entire visible spectrum at double this speed. The colored stixograph visible through the slit 28 may be transmitted or recorded on a continuously moving film 20.

Once the deployed image has been formed, and while its color is being changed continuously, it may be transmitted by any suitable television arrangement.

There will be apparent very many modifications, other than those described above, lying within the scope of the invention.

I claim:

1. Apparatus for producing a record characteristic of a moving object comprising means for supporting and producing continuous motion of a photo sensitive recording surface in one direction, means for producing upon said surface an image of the kind in which all elemental areas of said object are deployed in such a manner that they do not overlap one another regarded in said direction, and means for producing separate complementary color components of said image at a rate to provide persistence of vision.

2. Apparatus for producing a record characteristic of a moving object comprising means for supporting and producing continuous motion of a photo-sensitive recording surface in one direction, means for producing upon said surface an image of the kind in which all elemental areas of said object are deployed in such a manner that they do not overlap one another regarded in said direction and means for producing separate complementary color components of said image in a direction transverse of the direction of said deployment and at a rate to provide persistence of vision, 3. Apparatus for producing a record characteristic of a moving object comprising means for supporting and producing continuous motion of a photo-sensitive recording surface in one direction, means for producing upon said surface an image of the kind in which all elemental areas of said object are deployed in such a manner that they do not overlap one another regarded in said direction, a rotatable light filter having different color transmitting properties at different parts thereof located in the path of the light forming said image and means for producing rotation of said light filter to produce separate complementary color components of said image at a rate to provide persistence of vision.

4. Apparatus for producing a record characteristic of a moving object comprising means for supporting and producing continuous motion of a photo-sensitive recording surface in one direction, means for producing upon said surface an image of the kind in which all elemental areas of said object are deployed in such a manner that they do not overlap one another regarded in said direction, a rotatable light filter having different color transmitting properties at different parts thereof located away from a focal plane in the path of the light forming said image and means for producing rotation of said light filter to produce separate complementary color components of said image at a rate to provide persistence of vision.

5. Apparatus for producing a record characteristic of a moving object comprising means for supporting and producing continuous motion of a photo-sensitive recording surface in one direction, means for producing upon said surface an image of the kind in which all elemental areas of said object are deployed in such a manner that they do not overlap one another regarded in said direction, a prism located in the path of the light forming said image and positioned to split said light into its component colors, an apertured member positioned in the light path between said prism and said surface and means for producing oscillatory movement of said prism to produce separate complementary color components of said image at a rate to produce persistence of vision.

6. Apparatus for reproducing a continuous motion picture image in natural colors from a record thereof of the kind in which all elemental areas of the original object are deployed in such a manner that they do not overlap one another regarded in one direction, said apparatus comprising a light source, a screen, means for supporting said picture record in the light path between said source and said screen, means for producing continuous motion of said record in a direction transverse of the direction of said deployment, means for forming an image of said record upon said screen, means for deploying images of parts of said record relatively to images of other parts whereby the image on said screen is of the two-dimensional kind and means for producing separate complementary color components of the light forming said image at a rate to provide persistence of vision.

GEORGE WILLIAM WALTON.